(12) United States Patent  
Kaneda

(10) Patent No.: US 8,220,837 B2  
(45) Date of Patent: Jul. 17, 2012

(54) CONNECTOR DROP-OFF PREVENTION STRUCTURE AND CONNECTOR DROP-OFF PREVENTION METHOD

(75) Inventor: Fumio Kaneda, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 271 days.

(21) Appl. No.: 12/600,414

(22) PCT Filed: May 26, 2008

(86) PCT No.: PCT/JP2008/059637  
§ 371 (c)(1),  
(2), (4) Date: Nov. 16, 2009

(87) PCT Pub. No.: WO2008/152902  
PCT Pub. Date: Dec. 18, 2008

(65) Prior Publication Data  
US 2010/0148497 A1    Jun. 17, 2010

(30) Foreign Application Priority Data  
Jun. 12, 2007    (JP) ................................. 2007-155337

(51) Int. Cl.  
*F16L 35/00*    (2006.01)

(52) U.S. Cl. .............................. 285/87; 285/319; 29/428

(58) Field of Classification Search ................ 285/87, 285/81, 305, 320, 319; 29/428  
See application file for complete search history.

(56) References Cited

U.S. PATENT DOCUMENTS

| | | | |
|---|---|---|---|
| 5,360,237 A | 11/1994 | Carman et al. | |
| 5,395,140 A | 3/1995 | Wiethorn | |
| 5,649,724 A | 7/1997 | Wiethorn | |
| 5,658,020 A * | 8/1997 | Carman et al. | 285/81 |
| 6,601,878 B2 * | 8/2003 | Ooi et al. | 285/93 |
| 6,860,515 B2 * | 3/2005 | Inoue | 285/81 |
| 6,863,314 B2 * | 3/2005 | Guest | 285/81 |
| 6,979,026 B2 * | 12/2005 | Kasahara et al. | 285/81 |
| 7,104,571 B2 * | 9/2006 | Inoue et al. | 285/319 |
| 7,377,553 B2 * | 5/2008 | Takayanagi | 285/87 |
| 7,722,086 B2 * | 5/2010 | Ishiki et al. | 285/81 |
| 2004/0183295 A1 | 9/2004 | Kasahara et al. | |

FOREIGN PATENT DOCUMENTS

JP    6-45191 U    6/1994

(Continued)

*Primary Examiner* — David E Bochna  
(74) *Attorney, Agent, or Firm* — Arent Fox LLP

(57) ABSTRACT

In a state in which a fuel pipe (11) and a connector (13) are already joined, a swing fulcrum portion (14h) of a drop-off prevention holder (14) is engaged with the fuel pipe (11), and making the drop-off prevention holder (14) swing with this portion as a fulcrum allows a U-shaped first cutout (14d) formed in a first face (14b) to be fitted onto a small diameter portion (13c) of the connector (13), thus restricting the distance between a step (13b) and a second flange (11b) and thereby restraining the fuel pipe (11) and the connector (13) so that they do not separate. Since it is necessary to carry out a snap fitting operation only once in order for the small diameter portion (13c) of the connector (13) to pass through a narrow throat portion (b) formed partway along the first cutout (14d) of the drop-off prevention holder (14), the operation becomes easy compared with a case where snap-fitting operations are required a plurality of times, and the drop-off prevention holder (14) can be installed easily.

6 Claims, 13 Drawing Sheets

FOREIGN PATENT DOCUMENTS

| | | |
|---|---|---|
| JP | 6-323483 A | 11/1994 |
| JP | 08-512381 A | 12/1996 |
| JP | 11-6591 A | 1/1999 |
| JP | 2004-232828 A | 8/2004 |
| JP | 2005-214240 A | 8/2005 |
| WO | WO 96/34224 A1 | 10/1996 |

* cited by examiner ize entry of International

CONNECTOR DROP-OFF PREVENTION STRUCTURE AND CONNECTOR DROP-OFF PREVENTION METHOD

CROSS-REFERENCE TO RELATED APPLICATION

This application is a National Stage entry of International Application No. PCT/JP2008/059637, filed May 26, 2008, which claims priority to Japanese Patent Application No. 2007-155337, filed Jun. 12, 2007, the disclosure of the prior application is incorporated in its entirety by reference.

TECHNICAL FIELD

The present invention relates to a connector drop-off prevention structure that prevents, using a drop-off prevention holder, a connector joined to a pipe member from dropping off, and to a connector drop-off prevention method that prevents, using a drop-off prevention holder, a connector joined to a pipe member from dropping off.

BACKGROUND ART

An arrangement in which, when a connector is joined to a floor fuel tube made of metal and a fuel tube made of resin is joined to this connector, a clamp is installed between the floor fuel tube and the connector so that the two are not separated is known from Patent Publication 1 below.

The clamp is a box-shaped member having one open face and is equipped with a U-shaped cutout in each of two mutually opposing faces; one of the cutouts is fitted onto the outer periphery of the floor fuel tube so as to retain it in the axial direction, and the other cutout is fitted onto the outer periphery of the connector so as to retain it in the axial direction, thereby restraining the floor fuel tube and the connector so that they are not separated.

Patent Publication 1: Japanese Patent Application Laid-open No. 6-323483

DISCLOSURE OF INVENTION

Problems to be Solved by the Invention

However, the arrangement described in Patent Publication 1 has the problem that, when the clamp is installed, since one of the cutouts is snap-fitted onto the outer periphery of the floor fuel tube and the other cutout is snap-fitted onto the outer periphery of the connector, two snap-fitting operations are required, the working efficiency is therefore poor, and the clamp cannot be installed simply in a short time.

The present invention has been accomplished in the light of the above circumstances, and it is an object thereof to enable a drop-off prevention holder to be installed simply, the drop-off prevention holder restraining a pipe member and a connector, which are joined together, so that they do not separate.

Means for Solving the Problems

In order to attain the above object, according to a first aspect of the present invention, there is proposed a connector drop-off prevention structure in which, after a pipe member having in sequence from the tip a first flange and a second flange projectingly provided on the outer periphery in the vicinity of the tip, and a pipe-shaped connector having a large diameter portion at one end and a small diameter portion at the other end connected via a step are joined by inserting the first flange into the inner periphery of the large diameter portion, a drop-off prevention holder is installed so as to straddle both the pipe member and the connector, wherein the drop-off prevention holder is a box-shaped member with one open face; among a first face and a second face of the drop-off prevention holder, which are mutually opposing, a first cutout is formed in the first face so as to communicate with the open face, the first cutout fitting onto the small diameter portion so as to abut against the step, a throat portion having a slightly smaller width than the outer diameter of the small diameter portion being formed partway along the first cutout, a second cutout is formed in the second face so as to communicate with the open face, the second cutout fitting onto the pipe member so as to abut against the second flange, and a swing fulcrum portion is projectingly provided on the second face, the swing fulcrum portion being capable of engaging with the pipe member.

According to a second aspect of the present invention, in addition to the first aspect, the swing fulcrum portion comprises a base portion extending from one side of the second cutout of the second face in a direction linking the first and second faces, and an engagement portion extending from the extremity of the base portion toward the other side of the second cutout, the engagement portion being capable of engaging with the pipe member, and a distance between the engagement portion and the second face is larger than the diameter of the pipe member.

According to a third aspect of the present invention, in addition to the first or second aspect, the second cutout and the engagement portion are disposed so as to hold the pipe member in cooperation, and a bottom part of the second cutout and an inner face of the engagement portion are curved so as to follow the outer periphery of the pipe member.

According to a fourth aspect of the present invention, in addition to any one of the first to third aspects, the first face has an extension portion extending on the open face side.

According to a fifth aspect of the present invention, in addition to any one of the first to fourth aspects, a pair of mutually parallel flat faces extending in the axial direction are formed on the outer periphery of the large diameter portion of the connector, and the drop-off prevention holder is a member having a U-shaped cross-section in which one face parallel to the axis of the connector is open.

According to a sixth aspect of the present invention, there is proposed a connector drop-off prevention method in which, after a pipe member having in sequence from the tip a first flange and a second flange projectingly provided on the outer periphery in the vicinity of the tip, and a pipe-shaped connector having a large diameter portion at one end and a small diameter portion at the other end connected via a step are joined by inserting the first flange into the inner periphery of the large diameter portion, a drop-off prevention holder is installed so as to straddle both the pipe member and the connector so that, among a first face and a second face of the drop-off prevention holder, which are mutually opposing, a first cutout of the first face is engaged with the step and a second cutout of the second face is engaged with the second flange, thereby preventing the connector from dropping off from the pipe member, the method comprising a step of engaging a swing fulcrum portion projectingly provided on the second face of the drop-off prevention holder with the pipe member, a step of making the drop-off prevention holder swing toward the connector side with the swing fulcrum portion as a fulcrum, and a step of resiliently deforming a throat portion of the first cutout of the first face so as to be snap-fitted onto the small diameter portion of the connector.

It should be noted here that a fuel pipe 11 of an embodiment corresponds to the pipe member of the present invention.

Effects of the Invention

In accordance with the first aspect of the present invention, with regard to the drop-off prevention holder for preventing separation of the connector joined to the pipe member by engaging with the first flange thereof, since, among the mutually opposing first face and second face of the box-shaped member with one open face, the first cutout fitting onto the small diameter portion of the connector is formed in the first face, and the second cutout fitting onto the pipe member is formed in the second face, by making the drop-off prevention holder swing while engaging the swing fulcrum portion projectingly provided on the second face with the pipe member, the first face is fitted onto the small diameter portion of the connector and engages with the step, and the second face is fitted onto the pipe member and engages with the second flange, thereby preventing separation of the pipe member from the connector by means of the drop-off prevention holder.

In this arrangement, since the throat portion, which has a slightly smaller width than the outer diameter of the small diameter portion of the connector, is formed partway along the first cutout of the first face of the drop-off prevention holder, the throat portion widens and makes a snap sound while the small diameter portion is passing through, thereby enabling a worker to confirm that the drop-off prevention holder is reliably installed. Furthermore, since it is necessary to carry out a snap-fitting operation only once for installing the drop-off prevention holder, compared with a case where snap-fitting operations are required a plurality of times, the operation is easy, and the drop-off prevention holder can easily be installed. Moreover, when the drop-off prevention holder is installed, since the drop-off prevention holder may be made to swing with the swing fulcrum portion engaging with the pipe member as a fulcrum, not only is the operation of installing the drop-off prevention holder easier, but it is also possible to eliminate an incompletely joined state by drawing the connector toward the pipe member side accompanying the swinging when installing the drop-off prevention holder.

Furthermore, in accordance with the second aspect of the present invention, since the swing fulcrum portion of the drop-off prevention holder is formed from the base portion extending from one side of the second cutout of the second face in the direction linking the first and second faces, and the engagement portion extending from the extremity of the base portion toward the other side of the second cutout, the engagement portion being capable of engaging with the pipe member, and the distance between the engagement portion and the second face is made larger than the diameter of the pipe member, by making the drop-off prevention holder swing with the engagement portion of the swing fulcrum portion as a fulcrum in a state in which the pipe member is engaged between the engagement portion and the second face it can simply and reliably engage with the pipe member and the connector.

Moreover, in accordance with the third aspect of the present invention, since the second cutout and the engagement portion of the drop-off prevention holder are disposed so as to hold the pipe member in cooperation, and the bottom part of the second cutout and the inner face of the engagement portion are curved so as to follow the outer periphery of the pipe member, the second cutout and the engagement portion can reliably hold the pipe member by surrounding the outer periphery thereof.

Furthermore, in accordance with the fourth aspect of the present invention, since the first face of the drop-off prevention holder has an extension portion extending on the open face side, if an attempt is made to install the drop-off prevention holder in a state in which the pipe member and the connector are not completely joined, the extremity of the extension portion of the first face engages with the step of the connector to thus forcibly move the connector toward the pipe member side with a large stroke, thereby completely joining the pipe member and the connector.

Moreover, in accordance with the fifth aspect of the present invention, since the drop-off prevention holder is formed as a U-shaped cross-section member with one open face parallel to the axis of the connector, the pair of mutually parallel flat faces formed on the outer periphery of the large diameter portion of the connector are opposite the inner face of the drop-off prevention holder, thereby preventing rotation of the drop-off prevention holder relative to the connector.

Furthermore, in accordance with the sixth aspect of the present invention, with regard to the drop-off prevention holder for preventing separation of the connector joined to the pipe member by engaging with the first flange thereof, since, among the mutually opposing first face and second face, the first cutout fitting onto the small diameter portion of the connector is formed in the first face, and the second cutout fitting onto the pipe member is formed in the second face, by making the drop-off prevention holder swing while engaging the swing fulcrum portion projectingly provided on the second face with the pipe member, the throat portion of the first cutout of the first face resiliently deforms and is snap-fitted onto the small diameter portion of the connector so that the first face engages with the step of the connector, and the second face engages with the second flange of the pipe member, thereby preventing separation of the pipe member from the connector by means of the drop-off prevention holder.

In this process, a snap sound during the snap-fitting enables a worker to confirm that the drop-off prevention holder is reliably installed. Furthermore, since it is necessary to carry out a snap-fitting operation only once for installing the drop-off prevention holder, compared with a case where fitting operations are required a plurality of times, the operation is easy, and the drop-off prevention holder can easily be installed. Moreover, when the drop-off prevention holder is installed, since the drop-off prevention holder may be made to swing with the swing fulcrum portion engaging with the pipe member as a fulcrum, not only is the operation of installing the drop-off prevention holder easier, but it is also possible to eliminate an incompletely joined state by drawing the connector toward the pipe member side accompanying the swinging when installing the drop-off prevention holder.

EXPLANATION OF REFERENCE NUMERALS AND SYMBOLS

Figure 1:
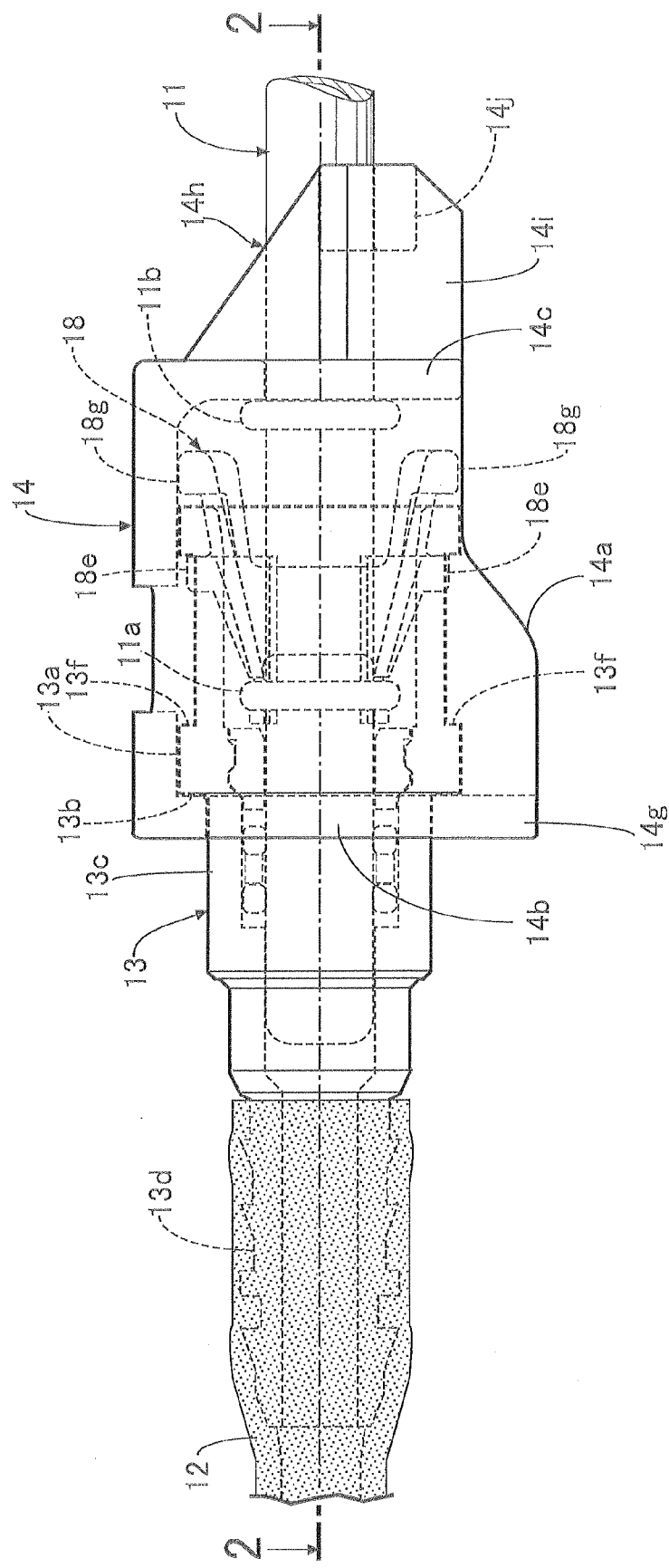
FIG. 1 is diagram showing a state in which a drop-off prevention holder is installed on a fuel pipe and a connector (first embodiment).

11 Fuel pipe (pipe member)
11a First flange
11b Second flange
13 Connector
13a Large diameter portion
13b Step
13c Small diameter portion
13e Flat face
14 Drop-off prevention holder
14a Open face
14b First face
14c Second face
14d First cutout
14f Second cutout
14g Extension portion
14h Swing fulcrum portion
14i Base portion
14j Engagement portion
b Throat portion
D Distance between engagement portion and second face

BEST MODE FOR CARRYING OUT THE INVENTION

A mode for carrying out the present invention is explained below by reference to an embodiment of the present invention shown in the attached drawings.

Embodiment 1

FIG. 1 to FIG. 13 show a mode for carrying out the present invention.

Figure 2:
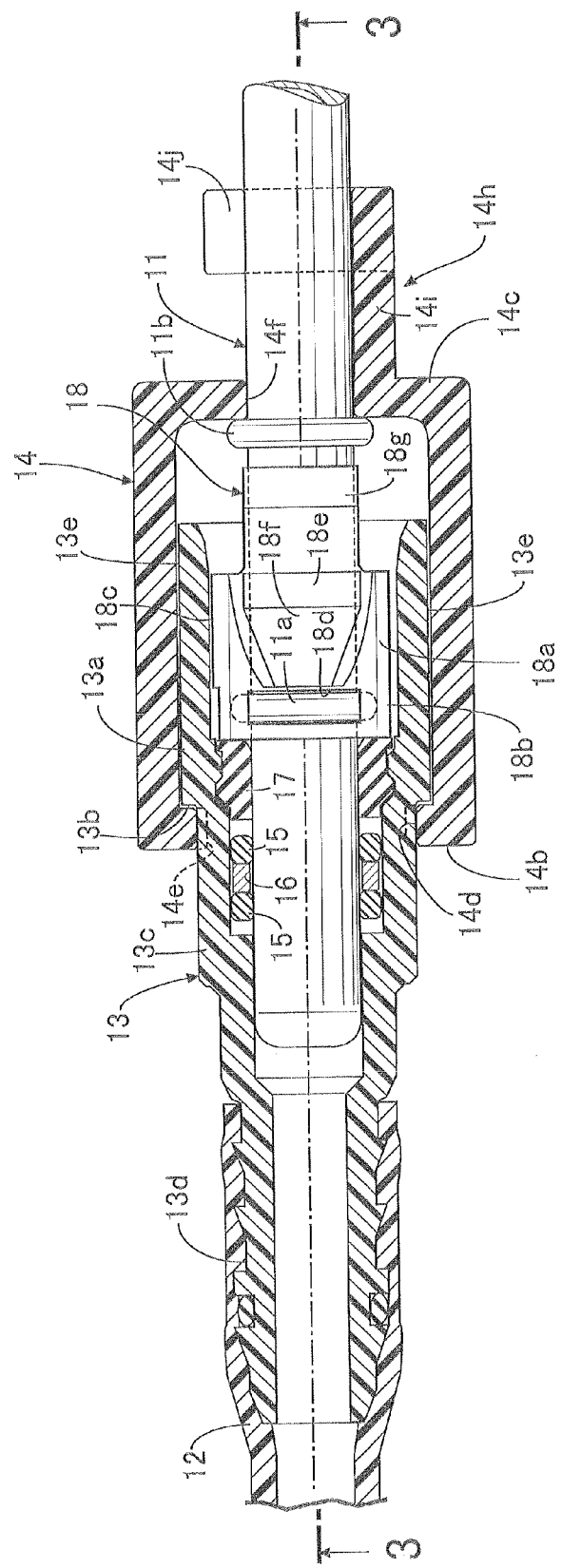
FIG. 2 is a sectional view along line 2-2 in FIG. 1 (first embodiment).
Figure 3:
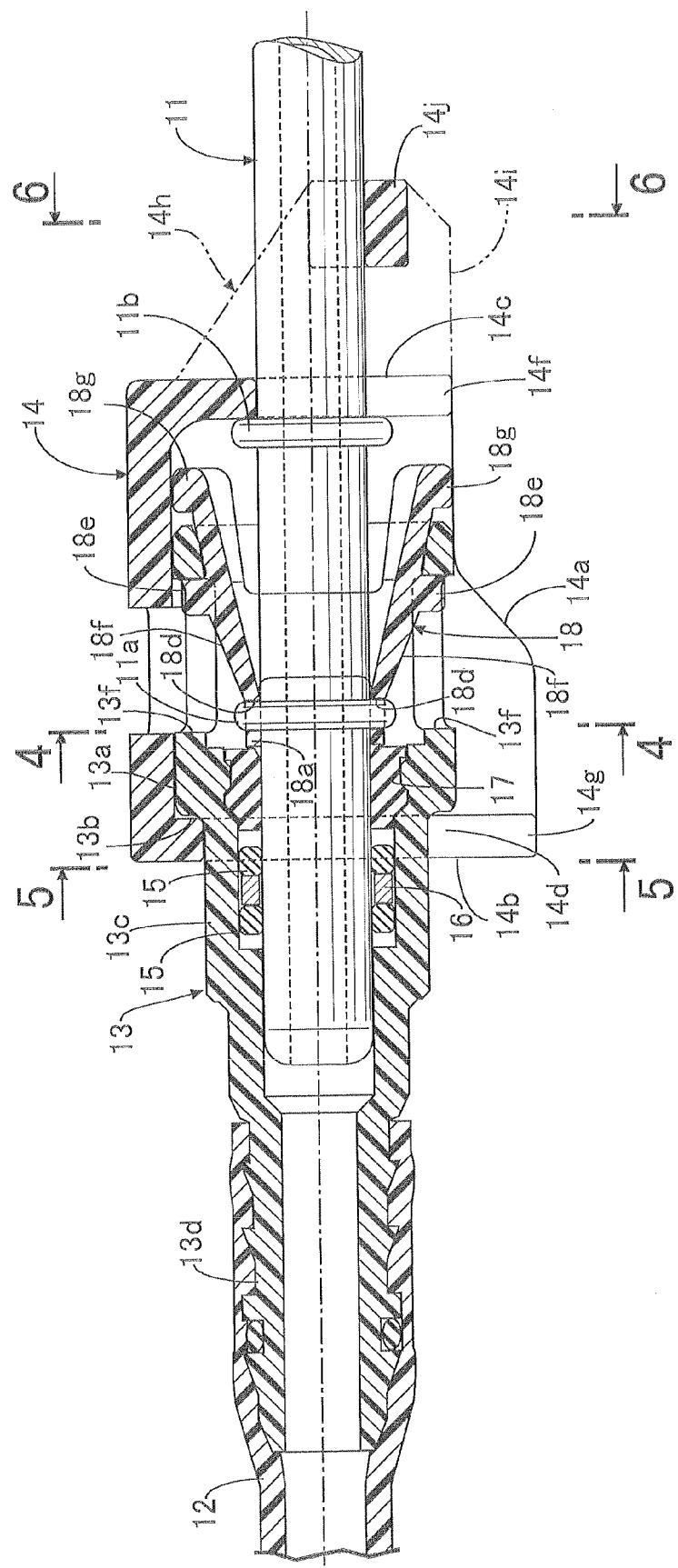
FIG. 3 is a sectional view along line 3-3 in FIG. 2 (first embodiment).

As shown in FIG. 1 to FIG. 3, when a fuel tube 12 made of resin is joined to a fuel pipe 11 made of metal provided toward an automobile engine side (or a fuel tank side), a connector 13 made of resin is first fixed to an end part of the fuel pipe 11, and the fuel tube 12 is press-fitted onto this connector 13. Since the fuel pipe 11 and the fuel tube 12 are exposed to a high fuel pressure, a drop-off prevention holder 14 made of resin is installed so as to straddle the fuel pipe 11 and the connector 13 so that the connector 13 does not drop off from the fuel pipe 11.

The fuel pipe 11 is a pipe having a basically constant diameter, and is formed so that in sequence from the tip an annular first flange 11a and an annular second flange 11b project radially outward.

The connector 13 includes, from one end to the other end, a large diameter portion 13a having a substantially circular section, a small diameter portion 13c that has a circular section and is connected to the large diameter portion 13a via a step 13b, and a further small diameter fuel tube linking portion 13d connected to the small diameter portion 13c, and the fuel tube 12 is fitted onto the outer periphery of the fuel tube linking portion 13d. A pair of O rings 15 and 15 are disposed on the inner periphery of the small diameter portion 13c via a spacer 16, a seal 17 is disposed on the inner periphery of the large diameter portion 13a in the vicinity of the step 13b, and the fuel pipe 11, which is inserted into the interior of the connector 13 from the large diameter portion 13a side, is fitted into and sealed with the inner periphery of the seal 17 and the O rings 15 and 15 via the portion on the tip side of the first flange 11a.

Figure 4:
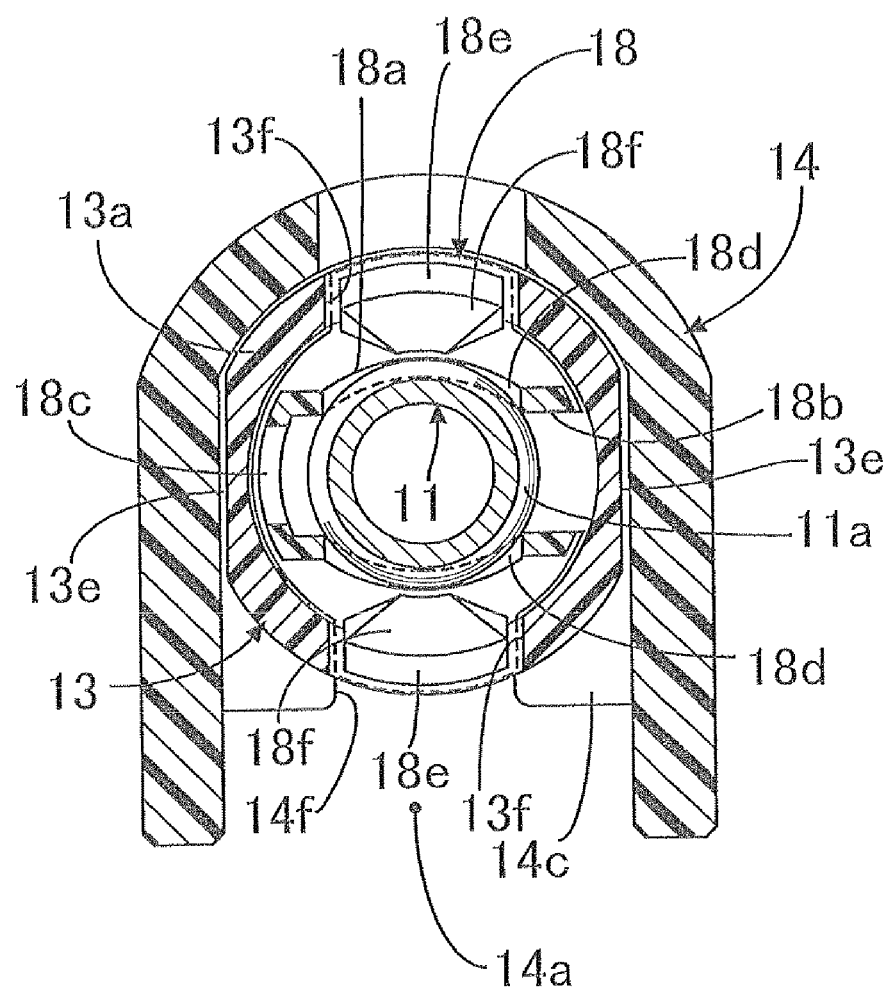
FIG. 4 is a sectional view along line 4-4 in FIG. 3 (first embodiment).

The outer periphery of the large diameter portion 13a of the connector 13 has a basically circular section, and by chamfering part thereof a pair of flat faces 13e and 13e that are parallel to each other and extend in the axial direction of the connector 13 are formed (see FIG. 4). A pair of rectangular window holes 13f and 13f are formed in positions displaced relative to the pair of flat faces 13e and 13e by a phase of 90°, that is, in a pair of arc faces on the outer periphery of the large diameter portion 13a of the connector 13. A lock member 18 formed from a separate member is disposed within the large diameter portion 13a of the connector 13.

Figure 7:
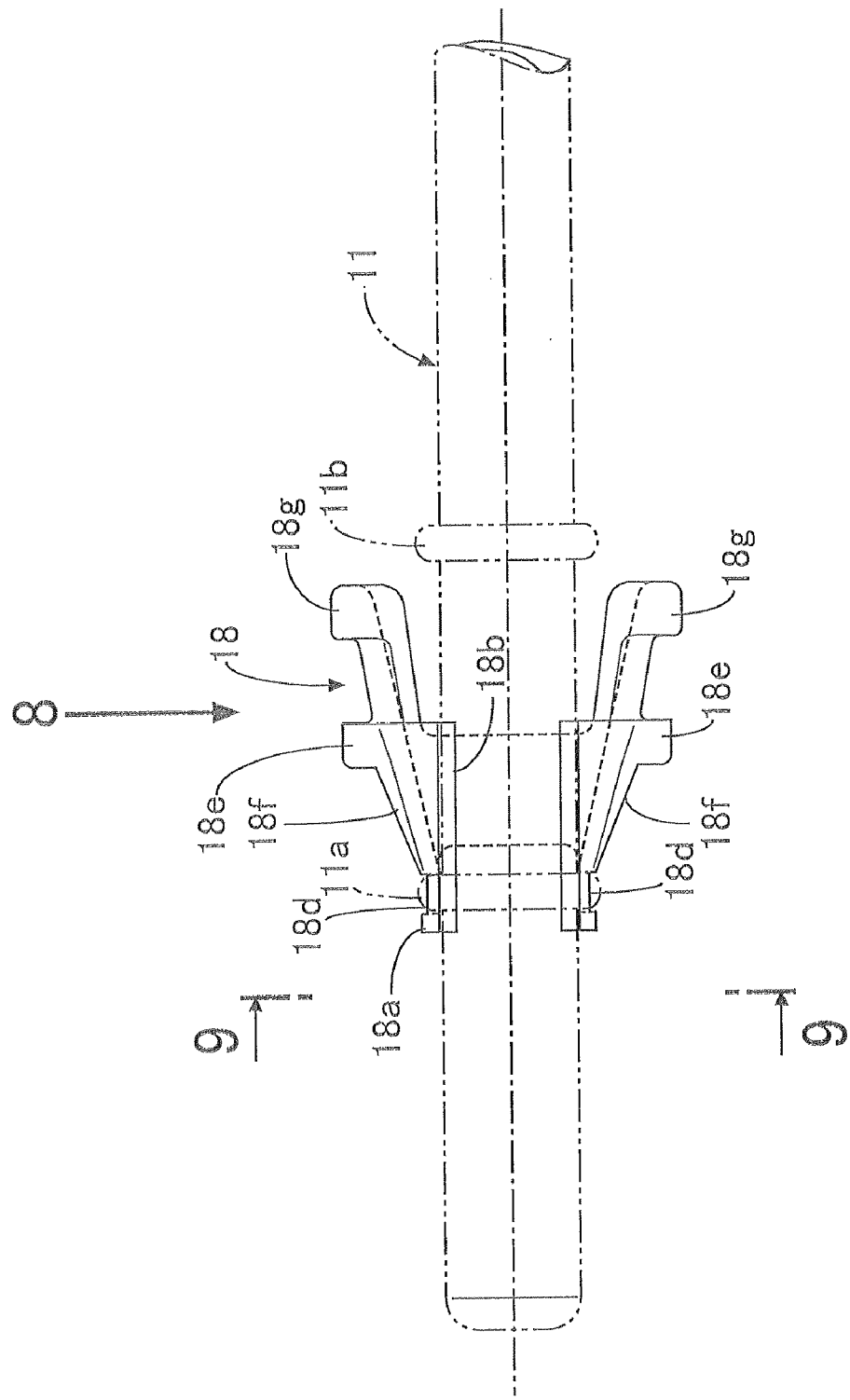
FIG. 7 is a side view of a lock member (first embodiment).
Figure 8:
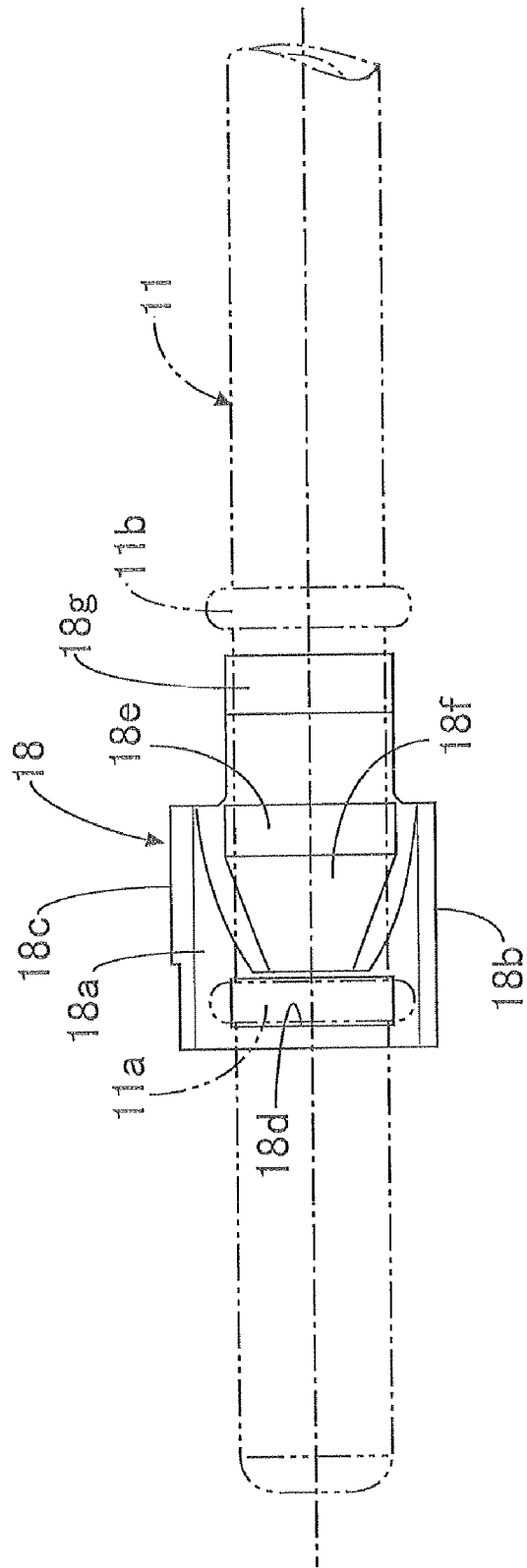
FIG. 8 is a view from arrow 8 in FIG. 7 (first embodiment).
Figure 9:
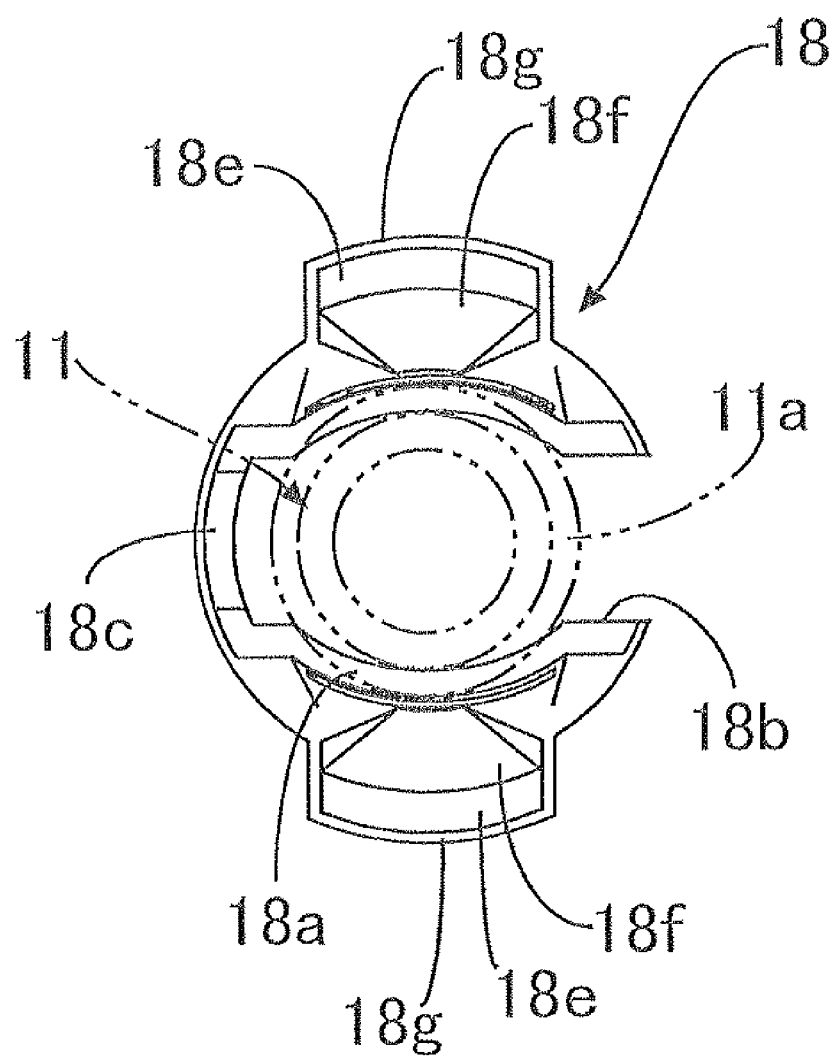
FIG. 9 is a sectional view along line 9-9 in FIG. 7 (first embodiment).

As shown in FIG. 7 to FIG. 9, the lock member 18 includes a cylindrical portion 18a fitted onto the outer periphery of the fuel pipe 11, and a slit 18b extending in the axial direction and an easily resiliently deformable flexible portion 18c are formed on one side and the other side of the axis of the cylindrical portion 18a so as to sandwich it (see FIG. 9). Furthermore, a pair of engagement grooves 18d and 18d that can engage with the first flange 11a of the fuel pipe 11 are formed in the peripheral face of the cylindrical portion 18a at positions displaced by a phase of 90° relative to the slit 18b and the flexible portion 18c. Moreover, a pair of engagement projections 18e and 18e are radially outwardly projectingly provided at positions adjacent to the pair of engagement grooves 18d and 18d of the cylindrical portion 18a via inclined faces 18f and 18f, the engagement projections 18e and 18e being capable of engaging with the window holes 13f and 13f of the connector 13. Moreover, a pair of knob portions 18g and 18g are formed in the vicinity of the engagement projections 18e and 18e, the knob portions 18g and 18g projecting outwardly in both the axial direction and the radial direction.

The structure of the drop-off prevention holder 14 is now explained by reference to FIG. 2 to FIG. 6.

The drop-off prevention holder 14 is a member having a U-shaped cross-section with an open face 14a parallel to the axis of the connector 13 when installed, and a first face 14b and a second face 14c, which are mutually parallel, are formed at axially opposite ends thereof. When the drop-off prevention holder 14 is installed, the first face 14b is positioned on the side closer to the fuel tube 12 and the second face 14c is positioned on the side further from the fuel tube 12. A substantially U-shaped first cutout 14d opening on the open face 14a is formed in the first face 14b of the drop-off prevention holder 14. As is clear from FIG. 5, the first cutout 14d is formed from an arc portion a positioned at the bottom of the cutout and in contact with the outer periphery of the small diameter portion 13c over an angle of greater than 180°, a pair of throat portions b and b positioned at opposite ends of the arc portion a so as to face each other and having a gap therebetween set slightly smaller than the diameter of the small diameter portion 13c, and a pair of guide portions c and c having a gap therebetween increasing in a tapered manner from the throat portions b and b toward the open face 14a.

Figure 6:
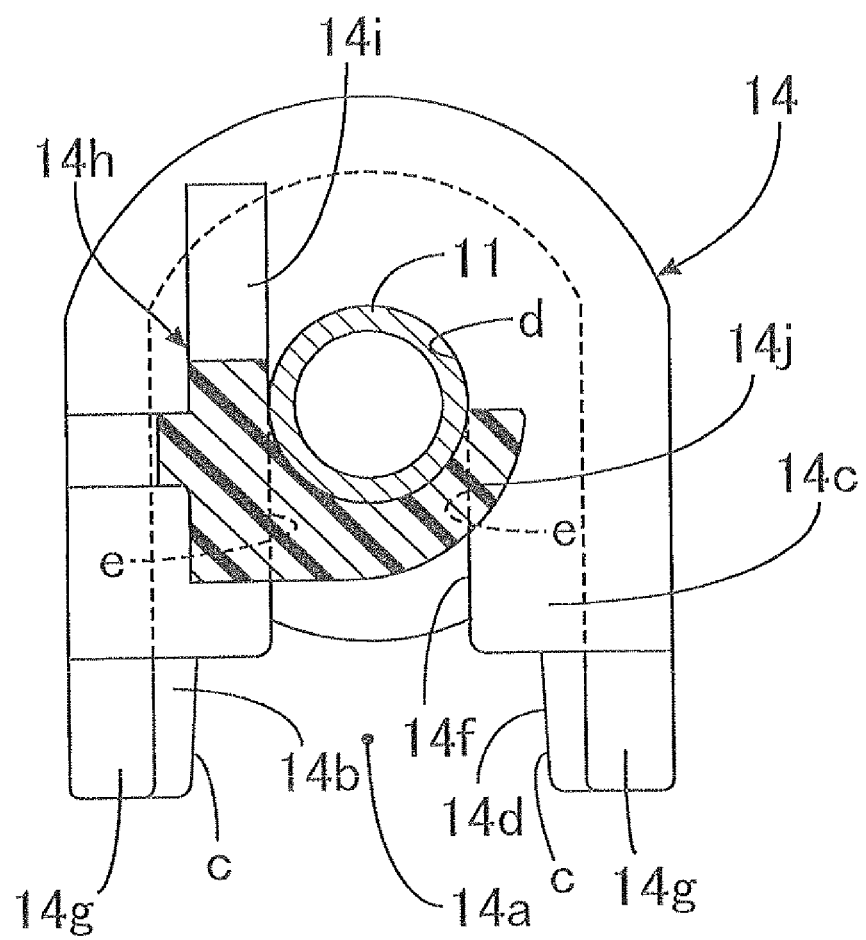
FIG. 6 is a sectional view along line 6-6 in FIG. 3 (first embodiment).

As is clear from FIG. 6, a second cutout 14f is formed from an arc portion d positioned at the bottom of the cutout and in contact with the outer periphery of the fuel pipe 11 over an angle of 180°, and a pair of guide portions e and e extending in parallel from the arc portion d toward the open face 14a with a gap that is substantially equal to the outer diameter of the fuel pipe 11.

Furthermore, extension portions 14g and 14g extending toward the open face 14a side are formed on the first face 14b so that the length in the first cutout 14d direction of the first face 14b is larger than the length in the second cutout 14f direction of the second face 14c.

A swing fulcrum portion 14h is formed integrally with the second face 14c of the drop-off prevention holder 14. The swing fulcrum portion 14h is formed from a plate-shaped base portion 14i extending in the axial direction (a direction linking the first and second faces 14b and 14c) from a position along one guide portion e of the pair of guide portions e and e of the second cutout 14f of the second face 14c, and an engagement portion 14j extending from the extremity of the base portion 14i in a direction perpendicular to the axis, that is, toward the other guide portion e of the second cutout 14f, and the inner face of the engagement portion 14j is formed in an arc shape having a central angle of about 180° so as to follow the outer periphery of the fuel pipe 11. The arc of the arc portion d on the bottom part of the second cutout 14f and the arc of the inner face of the engagement portion 14j are formed so that, in cooperation, they hold the outer periphery of the fuel pipe 11 over 360°. A distance D between the second face 14c and the engagement portion 14j (see FIG. 12) is set at a value larger than the diameter of the fuel pipe 11.

The operation of the embodiment of the present invention having the above arrangement is now explained.

Figure 10:
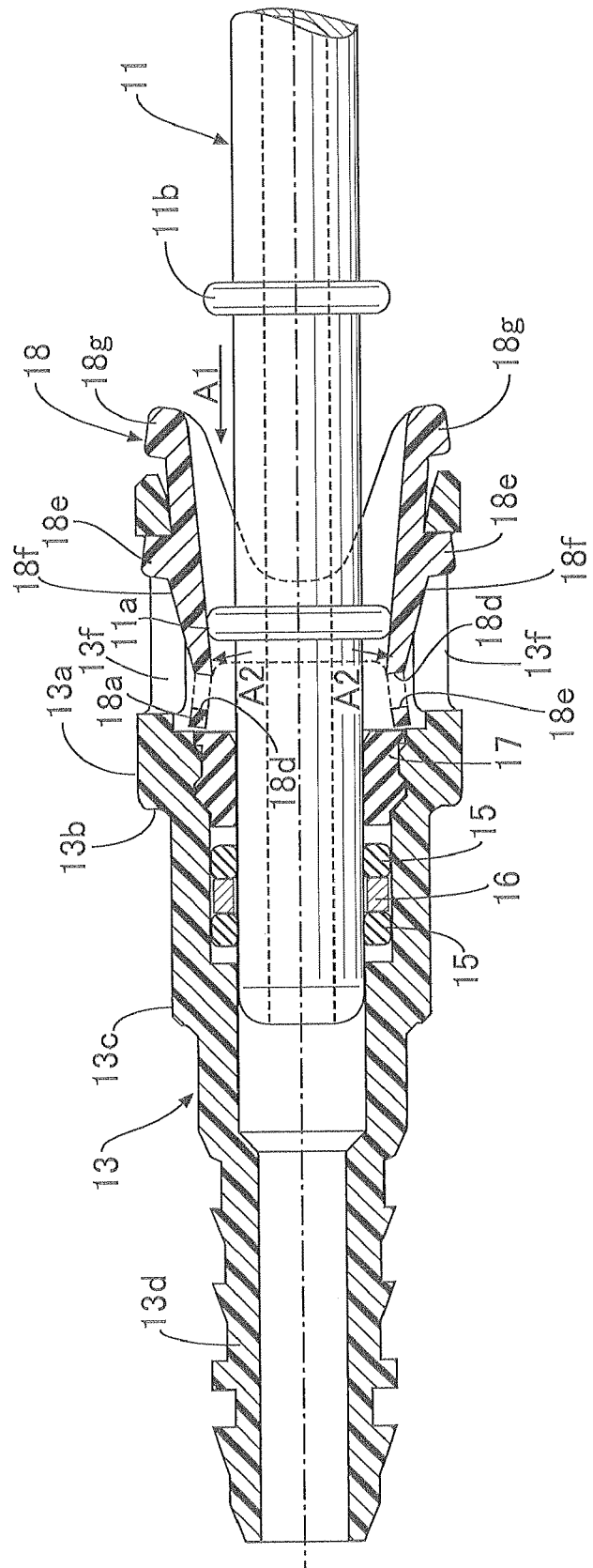
FIG. 10 is a diagram for explaining the operation when the connector is joined to the fuel pipe and the lock member (first embodiment).

In order to join the connector 13 to the fuel pipe 11, as shown in FIG. 10, the lock member 18 is inserted via an opening of the large diameter portion 13a of the connector 13 in the direction of arrow A1, the inclined faces 18f and 18f of the lock member 18 are made to abut against the opening of the large diameter portion 13a of the connector 13 so as to be resiliently deformed radially inwardly, and the engagement projections 18e and 18e are thereby engaged with the window holes 13f and 13f of the connector 13. Subsequently, when the fuel pipe 11 is inserted into the interior of the lock member 18, the first flange 11a pushes the cylindrical portion 18a of the lock member 18 so that it opens in the direction of arrow A2, and the first flange 11a engages with the pair of engagement grooves 18d and 18d, thus installing the lock member 18 on the connector 13.

Figure 11:
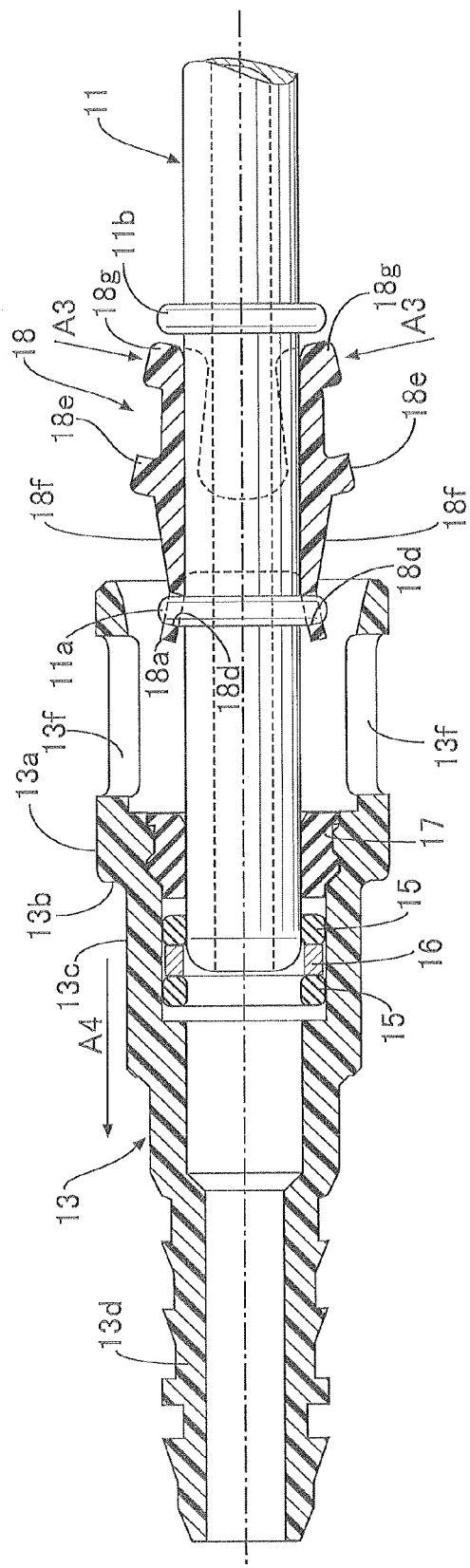
FIG. 11 is a diagram for explaining the operation when the connector is separated from the fuel pipe and the lock member (first embodiment).

On the other hand, in order to separate the fuel pipe 11 from the connector 13, as shown in FIG. 11 the pair of knob portions 18g and 18g of the lock member 18 are resiliently deformed in a direction in which they approach each other (see arrow A3), the engagement projections 18e and 18e are made to approach each other to thus disengage from the window holes 13f and 13f of the connector 13, and in this state the connector 13 is pulled out in the direction of arrow A4 to thus be separated from the fuel pipe 11. The lock member 18 remaining on the fuel pipe 11 can be separated from the fuel pipe 11 by resiliently deforming the flexible portion 18c so as to open the slit 18b.

When the connector 13 is installed on the fuel pipe 11 as described above, in order to prevent the fuel pipe 11 and the connector 13 from being inadvertently separated, the drop-off prevention holder 14 is installed so as to straddle the two.

Figure 12:
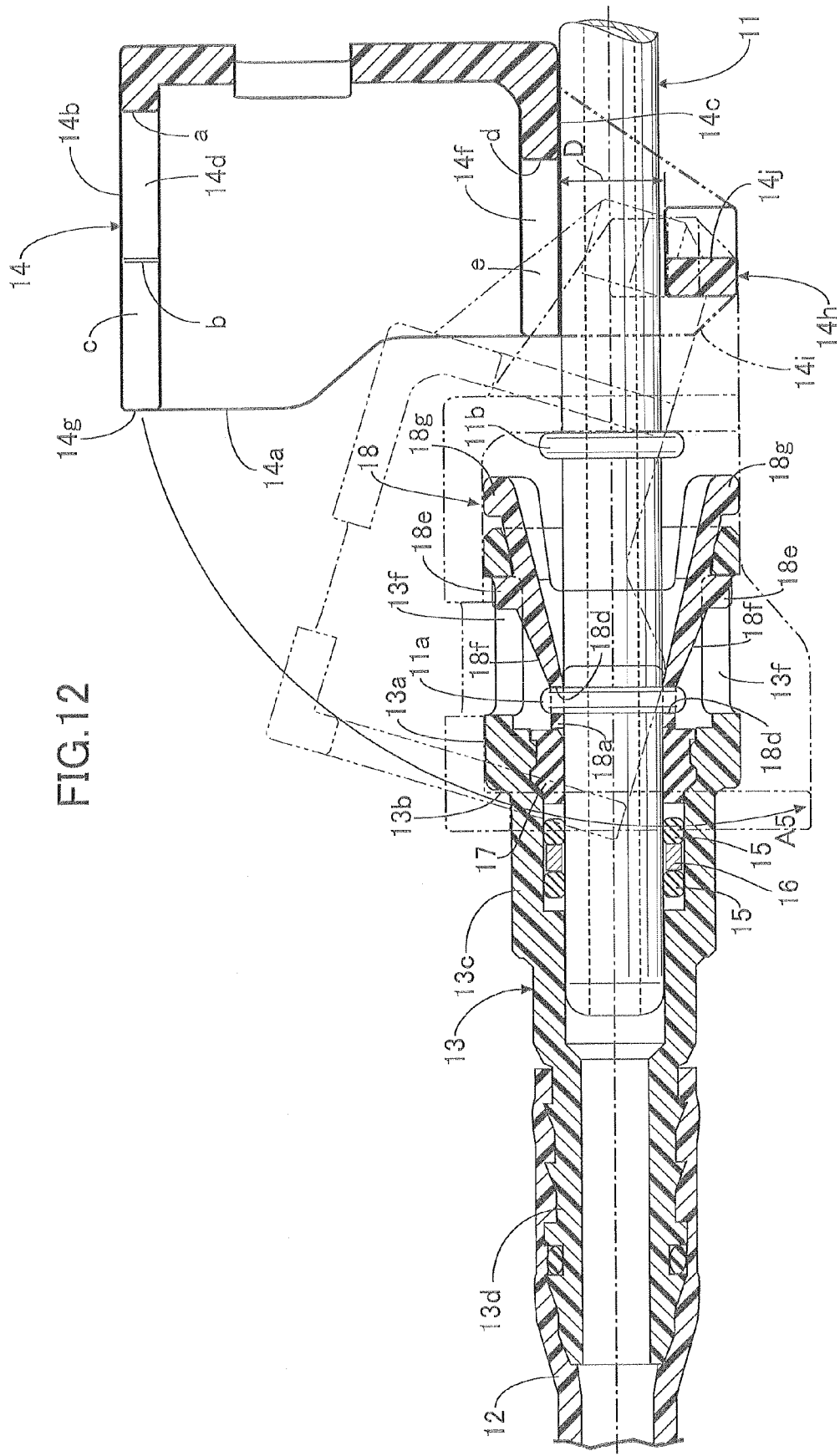
FIG. 12 is a diagram for explaining the operation when the drop-off prevention holder is installed (No. 1) (first embodiment).

As shown in FIG. 12, the fuel pipe 11 on the opposite side of the second flange 11b to the tip is engaged between the second face 14c and the engagement portion 14j at the extremity of the swing fulcrum portion 14h of the drop-off prevention holder 14. Since the distance D between the engagement portion 14j and the second face 14c is larger than the diameter of the fuel pipe 11, the swing fulcrum portion 14h of the drop-off prevention holder 14 can be installed on the fuel pipe 11 without any problem.

Subsequently, the drop-off prevention holder 14 is swung in the direction of arrow A5 with the portion of the engagement portion 14j abutting against the fuel pipe 11 as a fulcrum. As a result, as shown in FIG. 2 and FIG. 3, the second cutout 14f formed in the second face 14c of the drop-off prevention holder 14 is fitted onto the outer periphery of the fuel pipe 11, and the first cutout 14d formed in the first face 14b of the drop-off prevention holder 14 is fitted onto the outer periphery of the small diameter portion 13c of the connector 13.

Figure 5:
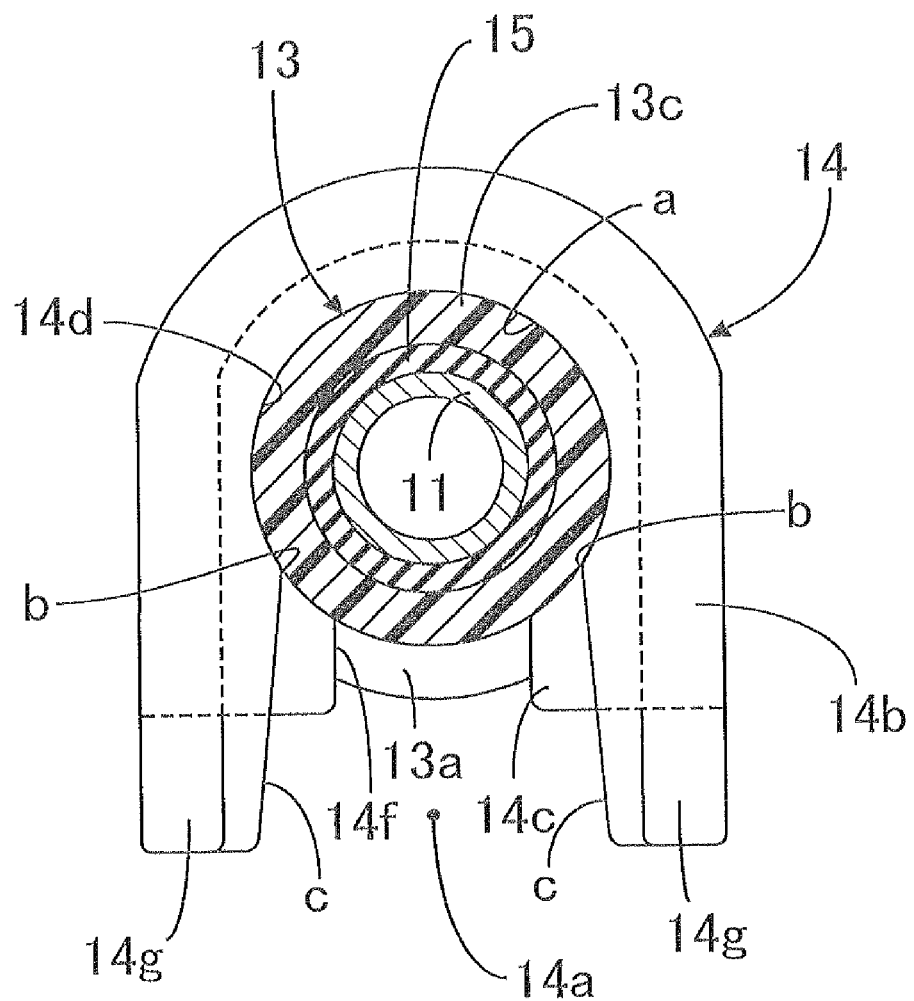
FIG. 5 is a sectional view along line 5-5 in FIG. 3 (first embodiment).

In this arrangement, since the throat portions b and b (see FIG. 5) having a slightly smaller width than the outer diameter of the small diameter portion 13c of the connector 13 are formed on the first cutout 14d of the first face 14b, the drop-off prevention holder 14 is resiliently deformed by being pushed wider by the small diameter portion 13c guided by the tapered guide portions c and c, the throat portions b and b open and then close, and the small diameter portion 13c is thereby snap-fitted into the arc portion a of the first cutout 14d while making a snap sound and is retained by the throat portions b and h so that it does not fall out from the first cutout 14d (see FIG. 5 and the broken line in FIG. 12). The snap sound made here enables a worker to confirm that the drop-off prevention holder 14 is reliably installed.

When the drop-off prevention holder 14 is installed in this way, since the flat faces 13e and 13e of the large diameter portion 13a of the connector 13 face the inner face of the drop-off prevention holder 14 across a slight gap (see FIG. 4), rotation of the drop-off prevention holder 14 relative to the connector 13 is prevented by the noncircular flat faces 13e and 13e. Furthermore, the entire periphery of the fuel pipe 11 is stably held by the arc portion d of the second cutout 14f of the second face 14c of the drop-off prevention holder 14 and the arc-shaped engagement portion 14j of the swing fulcrum portion 14h (see FIG. 6). The drop-off prevention holder 14 is retained without rattling by the connector 13 and the fuel pipe 11 both on the first face 14b side and the second face 14c side, thus making its installed state stable.

As shown in FIG. 2 and FIG. 3, when the drop-off prevention holder 14 is installed, the first face 14b around the first cutout 14d engages with the step 13b between the large diameter portion 13a and the small diameter portion 13c of the connector 13, and the second face 14c around the second cutout 14f engages with the second flange 11b of the fuel pipe 11, thereby making movement of the fuel pipe 11 and the connector 13 in directions away from each other impossible and thus reliably preventing inadvertent separation.

Since it is necessary to carry out a snapping operation only once for installing the drop-off prevention holder 14 by passing the small diameter portion 13c of the connector 13 through the throat portions b and b of the first cutout 14d of the first face 14b, the workability can be enhanced compared with a case where snapping operations are required a plurality of times. Moreover, when the drop-off prevention holder 14 is installed, since the drop-off prevention holder 14 may be swung with the swing fulcrum portion 14h engaging with the fuel pipe 11 as a fulcrum, the operation of installing the drop-off prevention holder 14 is easy.

Figure 13:
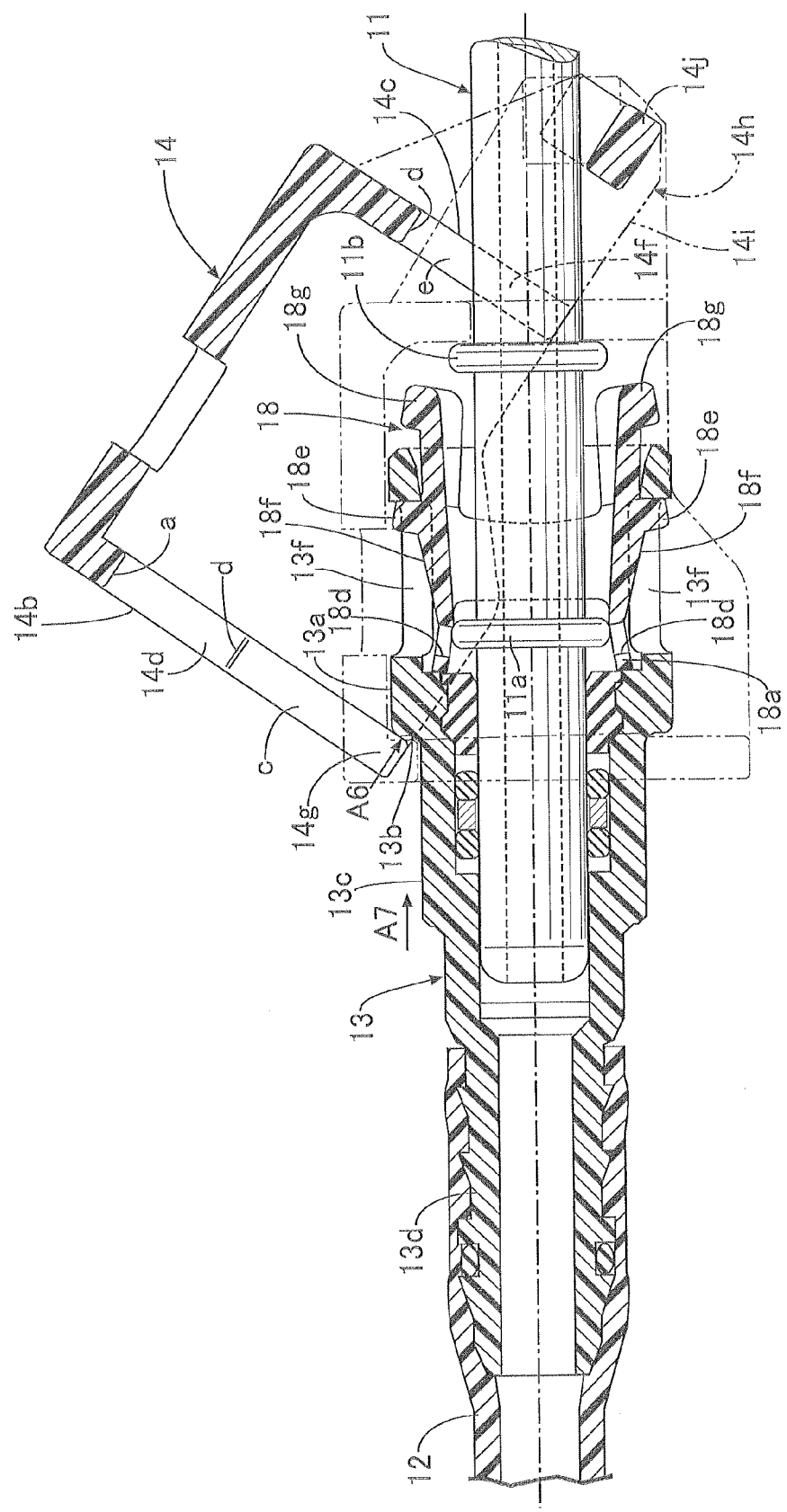
FIG. 13 is a diagram for explaining the operation when the drop-off prevention holder is installed (No. 2) (first embodiment).

When the fuel pipe 11 and the connector 13 are joined, as shown in FIG. 13, if the two are not completely joined, the first flange 11a of the fuel pipe 11 might not completely engage with the engagement grooves 18d and 18d of the lock member 18.

Even in such a case, since the extension portions 14g and 14g in which the first face 14b of the drop-off prevention holder 14 is extended toward the open face 14a side are formed, when installing the drop-off prevention holder 14 while swinging it, the extremity of the extension portions 14g and 14g can catch on the step 13b of the connector 13. When the drop-off prevention holder 14 is made to swing from a state denoted by the solid line in FIG. 13 to a state denoted by the broken line, the connector 13 pushed via the step 13b by the first face 14b in the direction of arrow A6 moves toward the fuel pipe 11 in the direction of arrow A7 through a large stroke corresponding to the extension portions 14g and 14g, and the first flange 11a of the fuel pipe 11 can be engaged completely with the engagement grooves 18d and 18d of the lock member 18.

An embodiment of the present invention is explained above, but the present invention may be modified in a variety of ways as long as the modifications do not depart from the spirit and scope thereof.

For example, in the embodiment the fuel pipe 11 is illustrated as the pipe member, but the pipe member of the present invention is not limited to the fuel pipe 11.

Furthermore, the extension portions 14g and 14g of the drop-off prevention holder 14 of the embodiment extend from the first face 14b in the same plane, but the extension portion 14g may be inclined or curved relative to the first face 14b in a direction away from the second face 14c, thus further enlarging the stroke with which the connector 13 is drawn in toward the fuel pipe 11.

Moreover, with regard to the drop-off prevention holder 14 of the embodiment, the engagement portion 14j of the swing fulcrum portion 14h is formed in an arc shape having a central angle of 180°, but the central angle may be slightly larger than 180°, thus enabling it to be fitted resiliently onto the outer periphery of the fuel pipe 11 and thereby reducing rattling due to vibration effectively.

The invention claimed is:

1. A connector drop-off prevention structure comprising:
a pipe member having a first flange and a second flange projectingly provided on an outer periphery of the pipe member;
a pipe-shaped connector having a large diameter portion at one end and a small diameter portion at the other end connected via a step, wherein the connector and the pipe member are joined by inserting the first flange into an inner periphery of the large diameter portion;
a drop-off prevention holder which straddles the pipe member and the connector,
wherein the drop-off prevention holder is box-shaped with an open face positioned intermediate a first face and a second face, the first face and the second face of the drop-off prevention holder opposing each from opposing ends of a longitudinal axis of the pipe member,
a first cutout is formed in the first face and communicates with the open face, the first cutout fitting onto the small diameter portion and abutting against the step,
a throat portion having a slightly smaller width than an outer diameter of the small diameter portion and being formed partway along the first cutout,
a second cutout is formed in the second face and communicates with the open face, the second cutout fitting onto the pipe member and abutting against the second flange; and
a swing fulcrum portion is projectingly provided on the second face, the drop-off prevention holder is fitted onto the connector by swinging the drop-off prevention holder toward the connector with the swing fulcrum portion being used as a fulcrum.

2. The connector drop-off prevention structure according to claim 1, wherein the swing fulcrum portion comprises a base portion extending from one side of the second cutout of the second face in a direction linking the first and second faces, and an engagement portion extending from the extremity of the base portion toward the other side of the second cutout, the engagement portion engaging the pipe member, and a distance between the engagement portion and the second face is larger than the diameter of the pipe member.

3. The connector drop-off prevention structure according to claim 1, wherein the second cutout and an engagement portion are disposed so as to hold the pipe member in cooperation, and a bottom part of the second cutout and an inner face of the engagement portion are curved to follow the outer periphery of the pipe member.

4. The connector drop-off prevention structure according to claim 1, wherein the first face has an extension portion extending on the open face side.

5. The connector drop-off prevention structure according to claim 1, wherein a pair of mutually parallel flat faces extending in parallel to the longitudinal axis of the pipe member are formed on the outer periphery of the large diameter portion of the connector, and the drop-off prevention holder is a member having a U-shaped cross-section in which one face parallel to a longitudinal axis of the connector is open.

6. A method of connecting a drop-off prevention holder including a pipe member having a first flange and a second flange projectingly provided on an outer periphery of the pipe member, a pipe-shaped connector having a large diameter portion at one end and a small diameter portion at the other end connected via a step, wherein the connector and the pipe member are joined by inserting the first flange into an inner periphery of the large diameter portion, a drop-off prevention holder which straddles the pipe member and the connector so that, among a first face and a second face of the drop-off prevention holder which oppose each other from opposing ends of a longitudinal axis of the pipe member, a first cutout of the first face (14b) is engaged with a step and a second cutout of the second face is engaged with the second flange to prevent the connector from dropping off from the pipe member, the method comprising
a step of engaging a swing fulcrum portion projectingly provided on the second face of the drop-off prevention holder with the pipe member,
a step of swinging the drop-off prevention holder toward the connector with the swing fulcrum portion as a fulcrum, and
a step of resiliently deforming a throat portion of the first cutout of the first face so as to be snap-fitted onto the small diameter portion of the connector.

* * * * *